(12) United States Patent
Sun et al.

(10) Patent No.: US 12,332,895 B2
(45) Date of Patent: Jun. 17, 2025

(54) HIGH-PERFORMANCE RESOURCE AND JOB SCHEDULING

(71) Applicant: INTERNATIONAL BUSINESS MACHINES CORPORATION, Armonk, NY (US)

(72) Inventors: Sheng Yan Sun, Beijing (CN); Xu Qin Zhao, Beijing (CN); Peng Hui Jiang, Beijing (CN); Jian Xu, Beijing (CN); Xuelian Zhang, Beijing (CN); Ting Ting Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/496,341

(22) Filed: Oct. 27, 2023

(65) Prior Publication Data

US 2025/0139093 A1    May 1, 2025

(51) Int. Cl.
*G06F 16/00* (2019.01)
*G06F 9/48* (2006.01)
(Continued)

(52) U.S. Cl.
CPC ...... *G06F 16/24549* (2019.01); *G06F 9/4881* (2013.01); *G06F 16/2455* (2019.01); *G06N 3/0464* (2023.01); *G06N 3/08* (2013.01)

(58) Field of Classification Search
CPC ........... G06F 16/9535; G06F 16/90335; G06F 16/904; G06F 2111/10; G06F 30/20;
(Continued)

(56) References Cited

U.S. PATENT DOCUMENTS 9,141,435 B2    9/2015  Wein
9,213,741 B2   12/2015  Burger et al.
(Continued)

FOREIGN PATENT DOCUMENTS

TW    200515189 A    5/2005
TW    202207109 A    2/2022
(Continued)

OTHER PUBLICATIONS

"High Performance DBMS Design for Intelligent Query Scheduling" Deepayan Patra, Dec. 2022. 71 pages.
(Continued)

*Primary Examiner* — Shyue Jiunn Hwa
(74) *Attorney, Agent, or Firm* — Lily Neff, Esq.; Rachel L. Pearlman, Esq.; Heslin Rothenberg Farley & Mesiti P.C.

(57) ABSTRACT

Computer implemented methods, systems, and computer program products include program code executing on a processor(s) obtains queries from sources via a query interface. The program code analyzes the queries to obtain attributes of the queries. The program code applies a trained classifier to the attributes to classify the queries into finite categories based on a predicted usage of a given resource type exceeding a pre-determined threshold and an anticipated execution duration for each query. The program code determines, based on the finite categories of the one or more queries and resource configurations of resources comprising the database service, which resource of the resources can efficiently execute each query of the one or more queries. The program code schedules each query of the one or more queries for execution by the determined resources.

20 Claims, 7 Drawing Sheets

(51) Int. Cl.
  *G06F 16/2453* (2019.01)
  *G06F 16/2455* (2019.01)
  *G06N 3/0464* (2023.01)
  *G06N 3/08* (2023.01)

(58) Field of Classification Search
  CPC ............ G06F 16/9538; G06F 16/9577; G06F 3/0605; G06F 3/0631; G06F 3/0667; G06F 3/067; G06F 3/0685; G06F 30/27; G06F 18/21; G06F 18/2113; G06F 18/23213; G06F 18/241; G06F 18/251; G06Q 10/00; G06Q 20/00; G06Q 30/00; G06Q 40/00; G06Q 50/00; G06Q 90/00; G06Q 99/00; G06N 20/00; G06N 5/022; G06N 20/10; G06N 20/20; H04W 16/10; H04W 16/14
  See application file for complete search history.

(56) References Cited

U.S. PATENT DOCUMENTS

| | | |
|---|---|---|
| 9,436,739 B2 | 9/2016 | Li et al. |
| 2017/0262185 A1* | 9/2017 | Long .................. G06F 3/0667 |
| 2019/0258631 A1 | 8/2019 | Pal et al. |
| 2020/0034357 A1* | 1/2020 | Panuganty ........ G06F 16/24578 |
| 2021/0026833 A1 | 1/2021 | Gunn et al. |
| 2021/0109932 A1 | 5/2021 | Tatsuhiro et al. |
| 2021/0312474 A1* | 10/2021 | Yu ......................... G06F 16/958 |
| 2021/0366017 A1* | 11/2021 | Lee .................... G06Q 30/0206 |
| 2022/0121260 A1 | 4/2022 | King et al. |
| 2023/0410011 A1* | 12/2023 | Ofoche ............ G06Q 10/06312 |

FOREIGN PATENT DOCUMENTS

| | | |
|---|---|---|
| WO | 2020/036738 A1 | 2/2020 |
| WO | 2023/070417 A1 | 5/2023 |

OTHER PUBLICATIONS

"Load Status Evaluation for Load Balancing in Distributed Database Servers" Dildar Husain, et al. May 2019. 26 pages.

"Storage Tag Aware Scheduler for Hadoop Cluster" Nawab Muhammad Faseeh Qureshi, et al. Jul. 2017. 15 pages.

International Searching Authority, "Notification of Transmittal of the International Search Report and the Written Opinion of the International Searching Authority, or Declaration," Patent Cooperation Treaty, Dec. 19, 2024, 12 pages, International Application No. PCT/ IB2024/059386.

* cited by examiner

HIGH-PERFORMANCE RESOURCE AND JOB SCHEDULING

BACKGROUND

The present invention relates generally to the field of workload scheduling in database systems and, specifically, to optimizing system performance based on improved workload-balancing techniques.

A database management system (DBMS) handles various query types, each with its own characteristics, which impact the system's performance. Resource allocation, such as central processing units (CPUs), memories, and disks, differs based on whether a query is CPU intensive, memory intensive, or input/output (I/O) intensive. Traditionally, load balancing for database servers relies on basic metrics like server idleness to determine where to direct a query or transaction. This approach can lead to resource congestion, particularly when multiple I/O intensive queries are sent to the same server within a short timeframe, resulting in slow responses. Additionally, server resources may be wasted when a server is occupied with I/O operations, causing the processor to remain idle while waiting for data processing. The challenges of load-balancing in database systems can be exacerbated in more complex computing environments. In a cloud environment or large-scale distributed computing cluster, these challenges arise.

Two current approaches to address workload balancing in database systems are referred to as Scale Up (vertical scaling) and Scale Out (horizontal scaling). Scale Up involves adding resources such as CPU, memory, and storage to a single node, expanding its capacity vertically to enhance computing or storage capabilities. Scale Up can quickly achieve upgrades with relatively simple operations, but as computing or storage requirements increase, the addition of hardware resources reaches a limit. For example, single nodes become expensive, costly to maintain, and pose a potential single point of failure. Meanwhile, Scale Out addresses distributed environments by horizontally meeting computing and storage demands through the addition of node resources. The decreasing costs of computing and storage units, along with improved efficiency, have enabled the use of low-end commercial systems and distributed technologies to create so-called supercomputing centers (e.g., private cloud platform solutions and public cloud platform solutions). But Scale Out is just a form of scaling up, but on a larger scale. As such, Scale Out introduces challenges such as enormous input, high energy consumption, and increased usage costs. Also, the presence of powerful computing, storage, and bandwidth capabilities at the edge nodes of everyday life highlights the issue of idle or uneven resource utilization.

Artificial intelligence (AI) refers to intelligence exhibited by machines Artificial intelligence (AI) research includes search and mathematical optimization, neural networks, and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

SUMMARY

Shortcomings of the prior art are overcome, and additional advantages are provided through the provision of a computer-implemented method for scheduling query execution by a database service based on predicted workload characteristics of one or more queries. The method can include: obtaining, by one or more processors, the one or more queries from one or more sources via a query interface; analyzing, by the one or more processors, the one or more queries to obtain attributes of the one or more queries; applying, by the one or more processors, a trained classifier to the attributes to classify the one or more queries into finite categories based on a predicted usage of a given resource type of a plurality of resource types exceeding a pre-determined threshold and an anticipated execution duration for each query of the one or more queries; determining, by the one or more processors, based on the finite categories of the one or more queries and resource configurations of resources comprising the database service, which resource of the resources can efficiently execute each query of the one or more queries; and scheduling, by the one or more processors, each query of the one or more queries for execution by the determined resources.

Shortcomings of the prior art are overcome, and additional advantages are provided through the provision of a computer program product for scheduling query execution by a database service based on predicted workload characteristics of one or more queries. The computer program product comprises a storage medium readable by a one or more processors and storing instructions for execution by the one or more processors for performing a method. The method includes, for instance: obtaining, by the one or more processors, the one or more queries from one or more sources via a query interface; analyzing, by the one or more processors, the one or more queries to obtain attributes of the one or more queries; applying, by the one or more processors, a trained classifier to the attributes to classify the one or more queries into finite categories based on a predicted usage of a given resource type of a plurality of resource types exceeding a pre-determined threshold and an anticipated execution duration for each query of the one or more queries, determining, by the one or more processors, based on the finite categories of the one or more queries and resource configurations of resources comprising the database service, which resource of the resources can efficiently execute each query of the one or more queries; and scheduling, by the one or more processors, each query of the one or more queries for execution by the determined resources.

Shortcomings of the prior art are overcome, and additional advantages are provided through the provision of a system for scheduling query execution by a database service based on predicted workload characteristics of one or more queries. The system includes: a memory, one or more processors in communication with the memory, and program instructions executable by the one or more processors via the memory to perform a method. The method includes, for instance: obtaining, by the one or more processors, the one or more queries from one or more sources via a query interface; analyzing, by the one or more processors, the one or more queries to obtain attributes of the one or more queries, applying, by the one or more processors, a trained classifier to the attributes to classify the one or more queries into finite categories based on a predicted usage of a given resource type of a plurality of resource types exceeding a pre-determined threshold and an anticipated execution duration for each query of the one or more queries; determining, by the one or more processors, based on the finite categories of the one or more queries and resource configurations of resources comprising the database service, which resource of the resources can efficiently execute each query of the one or more queries; and scheduling, by the one or more processors, each query of the one or more queries for execution by the determined resources.

Computer systems and computer program products relating to one or more aspects are also described and may be claimed herein. Further, services relating to one or more aspects are also described and may be claimed herein.

Additional aspects of the present disclosure are directed to systems and computer program products configured to perform the methods described above. Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
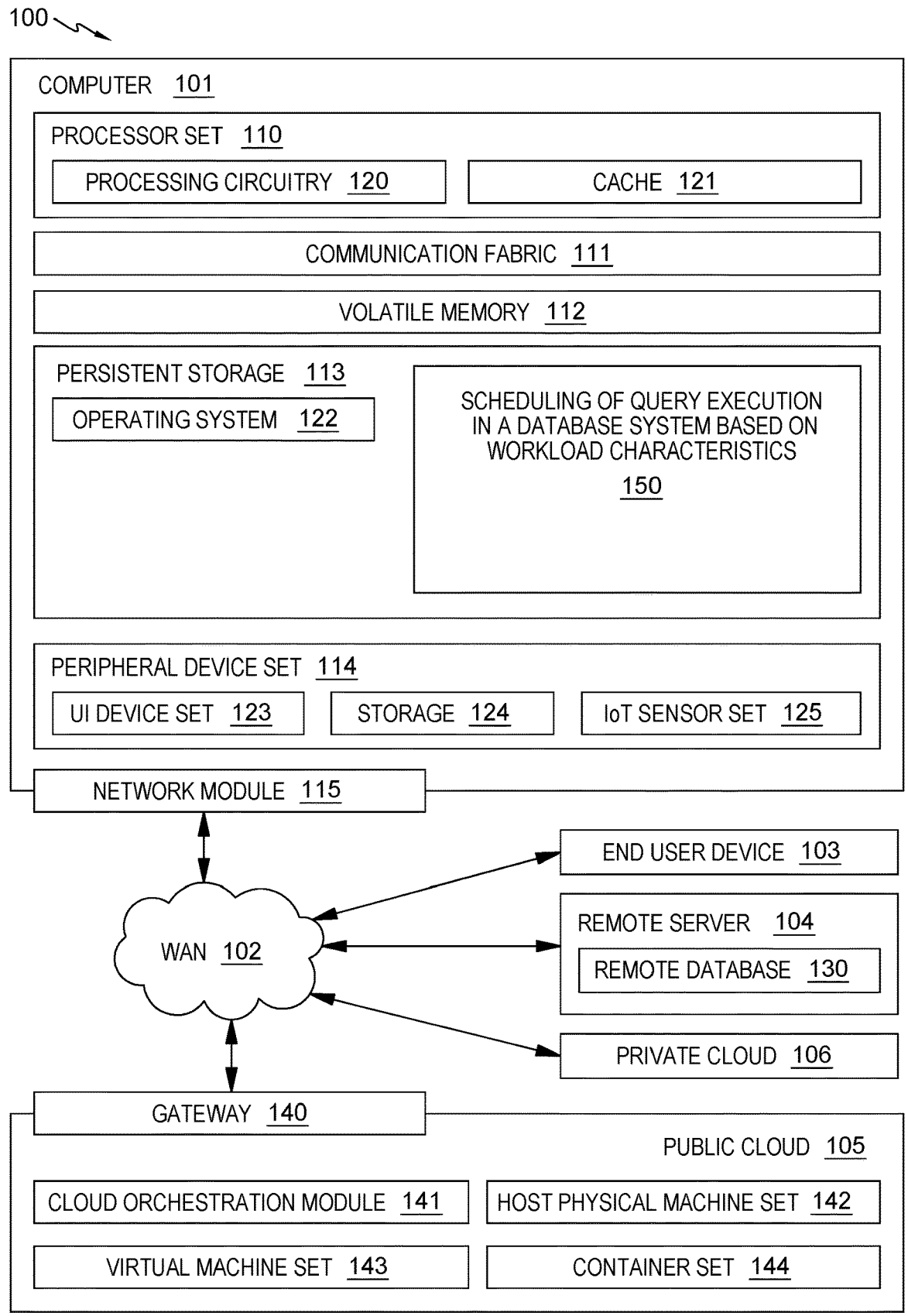
FIG. 1 depicts one example of a computing environment to perform, include and/or use one or more aspects of the present disclosure.

The examples herein include computer-implemented methods, computer program products, and computer systems where program code executing on one or more processors provides high-performance resource and job scheduling of query execution in a database system based on workload characteristics. Program code in some examples herein analyzes and predicts workloads and resource utilization in a computing environment and intelligently schedules jobs to optimize resource utilization based on attributes including, but not limited to, individual query traits. Unlike in existing approaches, program code in embodiments of the present invention considers aspects such as whether a query is CPU intensive, memory intensive, or I/O intensive when allocating resources, including CPU, memory, and disk space, to execute the query and return results to the requestor (e.g., an application). Additionally, to allocate the queries and manage the workloads associated with executing the queries, the program code, as an intelligent scheduler, configures an infrastructure, including microservices and resources, of the computing environment in which the scheduler schedules queries to be executed (e.g., to effectively manage and distribute queries). The examples herein include program code executing on one or more processors that: 1) trains and applies a classifier to bucket queries (to be executed) as intensive on different types of system resources, including but not limited to, CPU, memory, I/O, network, etc.; 2) generates an asymmetrical distributed database service with different configurations and utilizes the service to tag resources to indicate their characteristics; and 3) generates and applies an intelligent scheduler to configure microservices and resources in the computing environment in which the queries will be executed and schedules the queries for execution by these resources.

As aforementioned, the program code in examples herein configures microservices and other resources within a (distributed) environment in which these resources will execute the queries. A microservice architecture is a method of developing software systems that enables support for a range of platforms and devices, including but not limited to, web-enables devices, mobile devices, Internet of Things (IoT) devices, and wearables. Because of this cross-platform and cross-device flexibility, this architecture is often utilized in shared computing systems and distributed systems, including in cloud computing systems. Presently, microservices are seeing increased use in these cloud computing environments. A microservice architecture provides a method for developing software applications, which are also referred to herein as information services, as suites of independently deployable, small, modular services, in which each service runs a unique process and communicates through a well-defined, lightweight, mechanism to serve a defined goal (e.g., a database scheduling (e.g., management) service is an example of a software that can be deployed as a microservice). Thus, a microservice architecture can be utilized to deploy multiple services that work together as a unique application. In this architecture, the overall versioning is represented by the sum of the single service code version. The multiplicity of the services provides a cohesive software solution across devices and platforms.

There is no industry consensus regarding the properties of microservices, and an official definition is missing as well. For purposes of this document, a "microservice" is defined as set of code that includes instructions and data for performing a computational function (called a "service") in a manner so that: (i) the microservice can be used with other microservices to make applications in the form of collections of loosely coupled services; (ii) the service provided by the microservice is fine-grained; and (iii) the protocols of the microservice are lightweight.

Some other possible characteristics of microservices may include one, or more, of the following (herein collectively referred to as the Twenty Possible Microservices Characteristics"); (i) services in a microservice architecture (MSA) are often processes that communicate over a network to fulfill a goal using technology-agnostic protocols (herein referred to as "network-communicative microservices"); (ii) microservices respectively provide services that are independently deployable (herein referred to as "independently deployable microservices"); (iii) the services are easy to replace (herein referred to as "easily replaceable microservices"); (iv) services are organized around capabilities (for example, user interface front-end, recommendation, logistics, billing, etc.) (herein referred to as "capability-centric microservices"); (v) services can be implemented using different programming languages, databases, hardware and software environment, depending on what fits best (herein referred to as generically-implementable microservices"); (vi) messaging enabled; (vii) bounded by contexts; (viii) autonomously developed, (ix) decentralized; (x) built and released with automated processes (herein referred to as "automated microservices"); (xi) naturally enforces a modular structure; (xii) lends itself to a continuous delivery software development process; (xiii) a change to a small part of the application only requires rebuilding and redeploying only one or a small number of services, (xiv) adheres to principles of business-driven development (for example, domain-driven design); (xv) uses IDEAL cloud application architectures; (xvi) uses polyglot programming and persistence; (xvii) uses lightweight container deployment; (xviii) exhibits decentralized continuous delivery; (xix) uses DevOps with holistic service monitoring; and/or (xx) provides characteristics that are beneficial to scalability. Employing microservices enables the breaking down of complex applications into simpler independent processes.

The examples here include computer-implemented methods, computer-program products, and computer systems where program code executing on one or more processors effectively utilizes existing hardware resources and maximizes the overall performance of a DBMS by, in part, classifying workloads and passing these workloads to matching resources (e.g., resources with the characteristics that can optimize the executing the queries). The examples herein can be integrated with existing database products to improve workload performance and can also inform the hardware acquisition strategy of an administrator of an environment with one or more databases. The examples herein can include various aspects that manage a computing environment, the processes that are executed, and which resources in the environment will execute the processes (e.g., workloads associated with queries). Aspects can include an intelligent job scheduler, which schedules various workloads or parts of workloads to be processed by various resources. Program code of the scheduler can classify (e.g., utilizing one or more machine learning algorithm), and distribute queries to matching database services according to the classification. This intelligent scheduler is part of an asymmetrical distributed database service where multiple databases are distributed across different nodes or servers in some of these examples. The program code in the examples herein can configure microservices and resources to accommodate the workloads, as the program code can automatically increase resource availability based on predicted workload demands. However, the program code in the examples herein, in addition to automatically anticipating and adding new resources, can also optimize the use of existing resources within the system. As noted above, program code in various examples herein can utilize a machine learning algorithm (e.g., multiclass classification) and/or containerization techniques to classify workloads and assign them to matching resources to optimize resource utilization and achieve improvements in overall performance within the constraints of fixed existing resources.

Embodiments of the present invention are inextricably tied to computing and are directed to a practical application. The examples herein provide a computer-based solution to an issue in computing. Many applications and products rely on executing queries in databases. How these queries pull data from various databases within computing systems, such as distributed systems, can be managed by middleware, including database management software. As computing systems grow and enterprise, hybrid, and cloud or other distributed computing environments become more prevalent, inefficient queries can stress the system as a whole and can compromise the performance of the system. The examples herein are inextricably tied to computing at least because they improve the availability of resources through microservices and resource optimization, which can include replacement. As will be discussed herein, the computer program products, computer-implemented methods, and computing systems disclosed herein are directed to a practical application in that they provide high-performance resource and job scheduling (e.g., query execution) based on workload characteristics. Program code executing on one or more processors analyzes and predicts the workload and the current environment and utilizes intelligent job scheduling for optimized resource utilization. For example, program code in these examples acts as a job coordinator to oversee the entire process and maintain the workload distribution, leverage the asymmetrical distributed database service, and consider classification results and predictions (also accomplished by the program code through machine learning) to ensure that queries are directed to the most suitable database service.

The examples herein provide significantly more than existing approaches to enabling a DBMS to optimize resource utilization through efficient query distribution and scheduling. For example, although some existing approaches can assign priorities to queries based on known resource consumption or monitor query execution and store resource consumption (e.g., cost) based on this monitoring, various examples herein provide significantly more at least because program code in these examples can predict resource consumption for new queries with the machine learning techniques. The examples herein, unlike existing approaches, can classify workloads and pass them to matching resources and effectively utilize existing hardware resources and maximize the overall performance of the DBMS. These examples can be integrated with existing database products to improve workload performance. Based on integrating the examples herein into their technical environments, customers can develop reasonable hardware purchasing strategies.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

One example of a computing environment to perform, incorporate and/or use one or more aspects of the present disclosure is described with reference to FIG. 1. In one example, a computing environment 100 contains an example of an environment for the execution of at least some of the computer code involved in performing the inventive methods, such as a code block for scheduling of query execution in a database system based on workload characteristics 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction path that allow the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation and/or review to an end user, this recommendation would typically be communicated from network module 115 of computer 101 through WAN 102 to BUD 103. In this way, EUD 103 can display, or otherwise present, the recommendation and/or review to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation and/or review based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images" A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
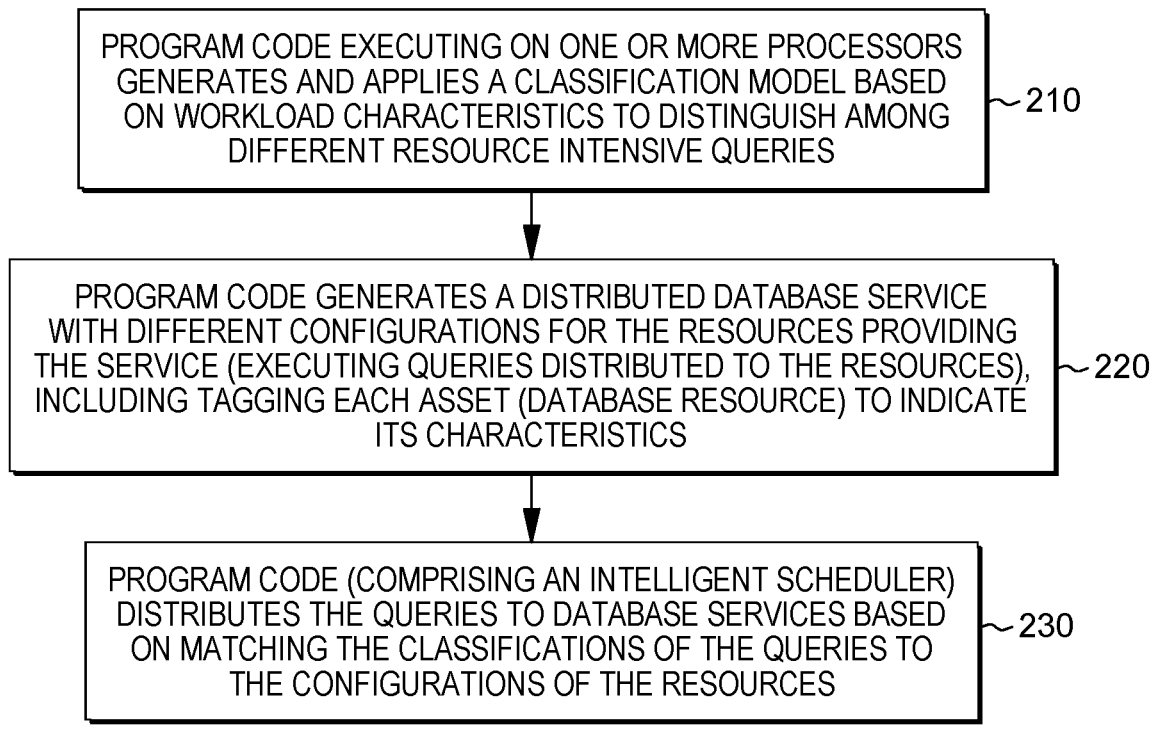
FIG. 2 is a workflow of various aspects performed by the program code (executing on one or more processors) in some embodiments of the present disclosure.

FIG. 2 is a general workflow 200 that illustrates various aspects of some embodiments of the present invention. Other figures provide additional details for certain aspects. In the examples herein, program code executing on one or more processors generates and applies a classification model based on workload characteristics to distinguish among different resource intensive queries (210). The program code can apply the model to classify queries to be executed in the system as intensive (based on a pre-determined threshold based on system resources include CPU/memory/IO/networks etc).

Figure 3:
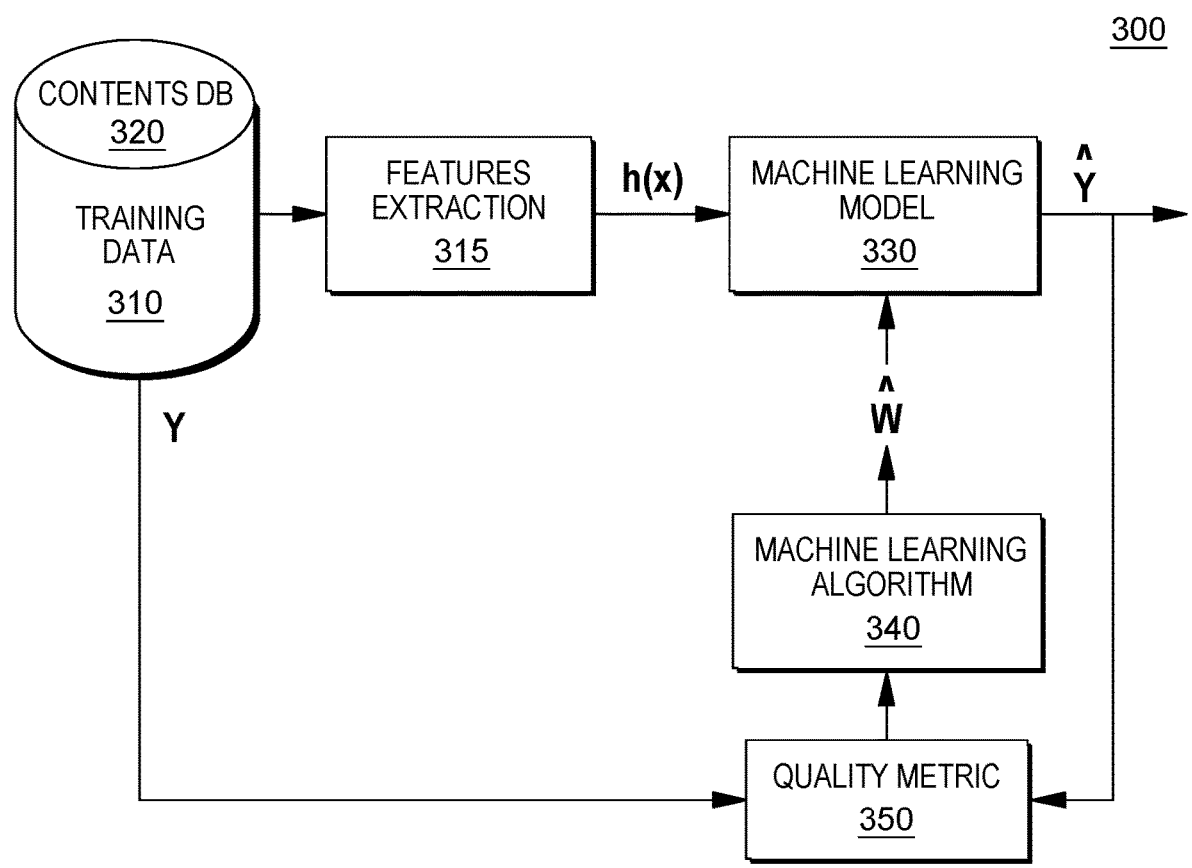
FIG. 3 is an example of a machine learning training system that can be utilized to perform cognitive analyses of queries to classify the queries based on workload characteristics.

The classification model generated by the program code (e.g., 210) can be referred to as a classifier, an example of which is illustrated in FIG. 3. This classifier can be comprised of various cognitive algorithms, AI instruction sets, and/or machine learning algorithms Classifiers can include, but are not limited to, deep learning models (e.g., neural networks having many layers) and random forests models. Classifiers classify items (data, metadata, objects, etc.) into groups, based on relationships between data elements in the metadata from the records. In the examples herein, program code collects database and system statistics and analyzes these statistics to provide to train and provide as input to the classier. The program code can utilize query statistics collection and analytics for feature modification to predict the query execution time and, in some examples, it can predict what type of resource executing the query will be intensive (based on a pre-determined threshold) upon. These statistics can include, but are not limited to, statistics from a database catalog (e.g., data dictionary, consisting of tables and views that describe the structure of the database), explain information (the explain keyword provides a description of how the SQL queries are executed by the databases), parser trees and tokenized SQL text data (e.g., a data structure for representing a parsed statement), sources of SQL (BI (business intelligence), OLTP (online transaction processing), ML (machine learning), streaming analytics, data science, data application, etc.), and output (e.g., query tag and priority). The program code in the examples herein also collects query attributes and corresponding labels for a dataset and preprocesses them by transforming and selecting relevant features, and trains the classifier (e.g., comprised of one or more machine learning algorithms) on the dataset. The attributes of the queries utilized as input to the classifier can include, but are not limited to, table statistics of tables referenced in queries (which the program code can utilize to identify table size) (e.g., cardinality, number of pages, active blocks, and/or number of overflows), access path of the queries (e.g., parallelism, sorting, tablespace scans, joins, aggregation), and/or the SQL text of the queries (e.g., whether a function is involved, if the query is read only).

The program code can utilize the trained model to evaluate query performance and thus, when trained the classifier can accurately classify queries based on their attributes. Through the training data, the model can learn about the queries and about the resources which would execute the queries and hence, the program code of the classifier can classifier individual queries as resource intensive in accordance with what type of resource intensive demands it predicts will be needed in a database system to execute the query. As a classifier is continuously utilized, its accuracy can increase as testing the classifier tunes its accuracy. When training a classifier, in some examples, program code feeds a pre-existing feature set describing features of metadata and/or data into the one or more cognitive analysis algorithms that are being trained (e.g., data related to the database system and previously executed queries). The program code trains the classifier to classify records based on the presence or absence of conditions, which can be known before the tuning. The presence or absence of the condition may not be noted explicitly in the records of the data set. When classifying a source as providing data of a given condition (based on the metadata), utilizing the classifier, the program code can indicate a probability of a given condition with a rating on a scale, for example, between 0 and 1, where 1 would indicate a definitive presence. The classifications need not be binary and can also be values in an established scale. In the examples herein, the program code can classify the queries as being intensive upon types of system resources based on conditions learned from training data.

A deep learning model can refer to a type of classifier. A deep learning model can be implemented in various forms such as by a neural network (e.g., a convolutional neural network). In some examples, a deep learning mode includes multiple layers, each layer comprising multiple processing nodes. In some examples, the layers process in sequence, with nodes of layers closer to the model input layer processing before nodes of layers closer to the model output. Thus, layers feed to the next. Interior nodes are often "hidden" in the sense that their input and output values are not visible outside the model.

Neural networks refer to a biologically inspired programming paradigm which enables a computer to learn from observational data. This learning is referred to as deep learning, which is a set of techniques for learning in neural networks. Neural networks, including modular neural networks, are capable of pattern recognition with speed, accuracy, and efficiency, in situations where data sets are multiple and expansive, including across a distributed network of the technical environment. Modern neural networks are non-linear statistical data modeling tools. They are usually used to model complex relationships between inputs and outputs or to identify patterns in data (i.e., neural networks are non-linear statistical data modeling or decision-making tools). In general, program code utilizing neural networks can model complex relationships between inputs and outputs and identify patterns in data. Because of the speed and efficiency of neural networks, especially when parsing multiple complex data sets, neural networks and deep learning provide solutions to many problems in image recognition, speech recognition, and natural language processing. Neural networks can model complex relationships between inputs and outputs to identify patterns in data, including in images, for classification.

A convolutional neural network (CNN) is a class of neural network. CNNs utilize feed-forward artificial neural networks and are most commonly applied to analyzing visual imagery. CNNs are so named because they utilize convolutional layers that apply a convolution operation (a mathematical operation on two functions to produce a third function that expresses how the shape of one is modified by the other) to the input, passing the result to the next layer. The convolution emulates the response of an individual neuron to visual stimuli. Each convolutional neuron processes data only for its receptive field. It is generally not practical to utilize general (i.e., fully connected feedforward) neural networks to process data rich objects, such as images, as very high number of neurons would be necessary, due to the very large input sizes associated with larger filed. Utilizing a CNN addresses this issue as it reduces the number of free parameters, allowing the network to be deeper with fewer parameters, as regardless of image size, the CNN can utilize a consistent number of learnable parameters because CNNs fine-tune large amounts of parameters and massive pre-labeled datasets to support a learning process. CNNs resolve the vanishing or exploding gradients problem in training traditional multi-layer neural networks, with many layers, by using backpropagation. Thus, CNNs can be utilized in large-scale recognition systems, giving state-of-the-art results in segmentation, object detection and object retrieval.

FIG. 3 illustrates an example of a classifier that can be generated by the program code and utilized in the examples herein to classify a query as intensive upon a specific type of system resource in a database system (e.g., CPU, Memory, IO, network, etc.) and also, in some examples, to determine the time (e.g., cost) for executing the query. The program code in some of the examples herein collects attributes of the system resource and query attributes and corresponding labels for a dataset, and preprocess the attributes by transforming and selecting relevant features. FIG. 3 is one example of a machine learning model with a classifier 300 that may be utilized, in one or more aspects, to generate and train resource models that can determine, based on the binary output provided by the machine learning models, that a given query should be classified as intensive on a specific type of resource. Hence, the program code obtains: 1) database and system statistics and analytics, and 2) workload query statistics collection and analytics. The program code can utilize the former for basic calculations and the latter for feature modification and to predict query execution time. The program code in embodiments of the present invention performs a cognitive analysis to generate one or more training data structures, including the aforementioned classification model (a machine learning model), which can include algorithms utilized by the program code to analyze the queries, based on the inputs. Machine learning (ML) solves problems that are not solved with numerical means alone. The program code can extract various attributes from the inputs and can utilize these attributes 315 (extracted by ML models) to develop a predictor or classifier function, h(x), also referred to as a hypothesis, which the program code utilizes as a machine learning model 330. In some embodiments, the input to the classifier is the binary output from each of the machine learning models. Thus, the classifier can determine whether a given query will be intensive or not for a given type of system resource.

In identifying various features and/or parameters indicative of whether a given query has a threshold probability of being intensive upon a type of system resource in the ML training data 310 (in a contents database 320), the program code can utilize various techniques to identify these attributes in an embodiment of the present invention. Embodiments of the present invention utilize varying techniques to select attributes (elements, patterns, features, components, etc.), including but not limited to, diffusion mapping, principal component analysis, recursive feature elimination (a brute force approach to selecting attributes), and/or a Random Forest, to select the attributes related to various queries and/or system resources. The program code may utilize a machine learning algorithm 340 to train the machine learning model 330 (e.g., the algorithms utilized by the program code), including providing weights for the conclusions, so that the program code can train the predictor functions that comprise the machine learning model 330. For example, the program code of the model can predict the time to execute a given query as well as what type of resource the query would be intensive upon (based on a pre-determined and/or pre-configured threshold related to the system resources). The conclusions may be evaluated by a quality metric 350. By selecting a diverse set of ML training data 310, the program code trains the machine learning model 330 to identify and weight various attributes (e.g., features, patterns, components) that correlate to queries and whether these queries utilize above a threshold of a certain resource type in the system (to a degree that can be pre-defined).

The model generated by the program code can be self-learning as the program code updates the model based on active feedback, as well as from the feedback received from data related to query performance of queries and performance of the resource that are assigned (by the program code of the job scheduler to execute these queries). For example, when the program code determines that there is information that was not previously predicted or classified by the model, the program code utilizes a learning agent to update the model to improve classifications in the future. Additionally, when the program code determines that a classification is incorrect, either based on receiving user feedback through an interface or based on monitoring query and/or resource performance in the system, the program code updates the model to reflect the inaccuracy of the classification (e.g., for the given period of time). Program code comprising a learning agent can cognitively analyze the data deviating from the modeled expectations and can adjust the model to increase the accuracy of the model, moving forward.

Figure 4:
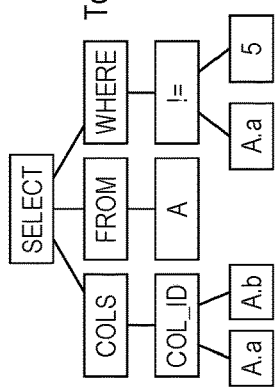
FIG. 4 illustrates how program code in embodiments in the present disclosure can utilize machine learning to train a classifier such as that illustrated in FIG. 4.

FIG. 4 illustrates an example 400 of how program code in some examples herein can build a classification model. In FIG. 4, program code executing on one or more processors trains a supervised ML algorithm (e.g., a multiple class classifier) on labeled examples of input/output pairs. In this example, the program code of a classification algorithm 422 (the classifier) generates output 432 when it determines (predicts) whether queries are intensive on CPU with a long duration P1, intensive on I/O with a short duration P2, and/or intensive on memory with a short duration P3. These are just some examples of classifications that a classification algorithm can make in certain examples herein. The program code learns patterns to make these predictions (P1, P2, and P3) as output 432 based on the characteristics of the input 412, assigning the appropriate class and describing the queries. As aforementioned and illustrated herein, the input 412 includes statistics from the catalog 414, explain information 416, parser trees 418 (which the program code can convert into or otherwise obtain as tokenized SQL text data), and a source of SQL 419 (for each query, e.g., a relational database or another source of data that can be accessed). The program code of the classification algorithm 422 takes this input 412 and predicts, for each query, based on learned patterns, behavior, provided as output 432 such as being CPU intensive with a long duration (P1), I/O intensive with a short duration (P2), or memory-intensive with a short duration (P3).

Returning to FIG. 2, the program code makes determinations about both the queries that will be executed is a database system (housed in a computing environment) and the resources that can be utilized to execute these queries. To that end, the program code generates a distributed database service with different configurations for the resources providing the service (executing queries distributed to the resources), including tagging each asset (database resource) to indicate its characteristics (220). The multiple databases that the program code can schedule the workloads (e.g., queries) to execute can be multiple databases that are distributed across different nodes or servers. The program code tags each resource to indicate the specific attributes of each database. The program code (comprising an intelligent scheduler) distributes the queries to database services based on matching the classifications of the queries to the configurations of the resources (230). In distributing the queries, the program code can utilize characteristics including but not limited to, workload statistics, such as query execution time prediction and feature modification, along with database and system statistics, for efficient distribution and resource allocation.

Figure 5:
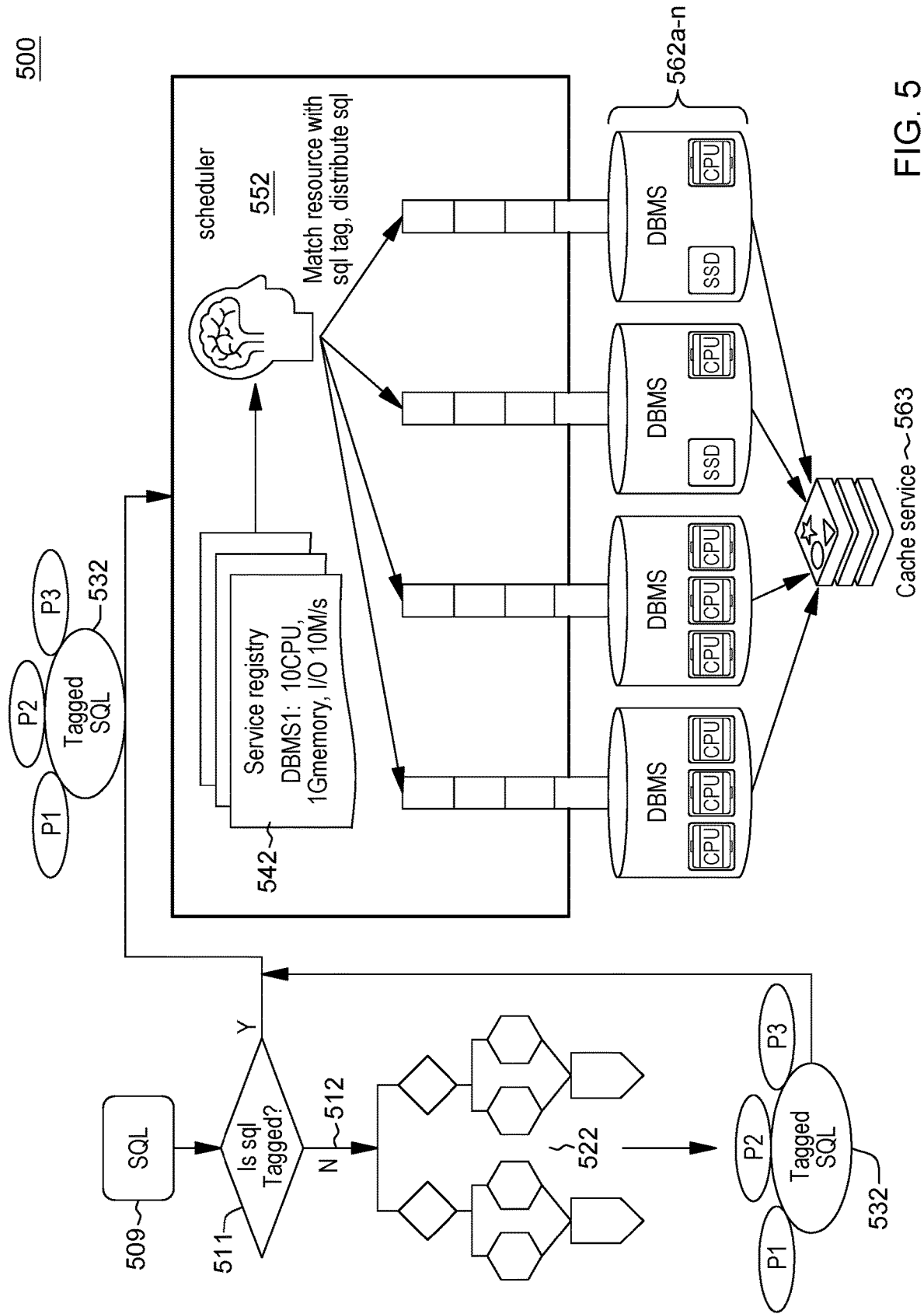
FIG. 5 illustrates the scheduling of various queries by program code in various examples herein.

FIG. 5 illustrates the asymmetrical distribution service 500 generated and operated by the program code in examples herein. The program code tags each resource of the database resources 562a-562n to which the program code distributes the queries. Each database resource of the database resources 562a-562n in this example is a DBMS with one or more CPU and/or SSD (solid states drive). In some examples herein, program code generates a distributed database service with different configurations for the database resources 562a-562n providing the service (and, in this example, a common cache service 563 to cache query results and/or to act as a scheduling cache). Each database can have its own unique configuration and characteristics and thus, the program code distributes tags to label and indicate the specific attributes of each database resource 562a-562n. The program code can obtain characteristics (e.g., CPU/memory/IO/network) of the database resources 562a-562n from a service registry 542. In this example, the service registry 542 indicates that a given database resource (e.g., DBMS1) of the database resource 562a-562n, has 10 CPU, 1G of memory, I/O of 10 M/s. The program code comprising the scheduler 552 can match database resources 562a-562n to queries and/or portions of queries (e.g., SQL tags) and distribute the SQL (e.g., queries or part of queries) to the matched resources.

The distributed environment can include a cloud environment. In some examples, in configuring database resources 562a-562n, the program code can set up various microservices and resources within the distributed environment. By setting up microservices and allocating resources (for query distribution) in the distributed environment, the program code establishes the infrastructure for the program code of the scheduler 552 to manage and distribute queries. This setup enables scalability and efficient resource utilization within the system. The program code, in advance of scheduling queries for execution by various resources, or during runtime can determine that part of system lacks resources sufficient to execute portions of the obtained SQL queries 509 and can utilize resource replacement to increase database resources 562a-562n automatically.

As illustrated in FIG. 5, program code obtains queries comprising SQL 509. The program code determines whether the SQL query 509 is tagged (511). SQL tags indicate whether a given SQL query 509 is intensive on a specific type of resource (e.g., FIGS. 4-5, P1, P2, P3). If the SQL queries 509 are not tagged, the program code obtains input 512 (e.g., FIG. 4, input 412 (including statistics from a catalog 414, explain information 416, parser tree 418, and/or source of SQL 419). The program code applies a trained classifier 522 to the input 512 and the classifier classifies the unlabeled queries, which includes, in this example, labeling these SQL queries (e.g., P1, P2, P3). The program code of the scheduler 552 obtains the tagged SQL queries 532 (both those tagged initially and by the classifier 522), and matches the SQL queries 509 to database resources 562a-562n, for execution by the resources 562a-562n. The tagged queries 532 are tagged by the program code to indicate the classification and prediction associated with each query (whether known or generated by the classifier 522). When distributing the SQL queries 509, the program code comprising the scheduler 552 utilizes workload statistics, such as query execution time prediction and feature modification, along with database and system statistics, for efficient distribution and resource allocation.

The scheduler 552 in FIG. 5 is a job coordinator. In assigning SQL queries 509 to database resources 562-562n, the program code of the scheduler 552 oversees and maintains a workload distribution process. The program code of the scheduler 552 can leverage the asymmetrical distributed database service, which consists of database resources 562a-562n with different configurations tagged with their specific characteristics (e.g., CPU, memory, I/O, network, etc.). By considering the classification results and predictions (e.g., tagged SQL queries 532), the scheduler 552 can ensure that SQL queries 509 are directed to the most suitable database services (e.g., database resources 562-562n). For example, one particular query can see a very big improvement because it is directed to run on a database server that can perform a sort more quickly.

Figure 6A:
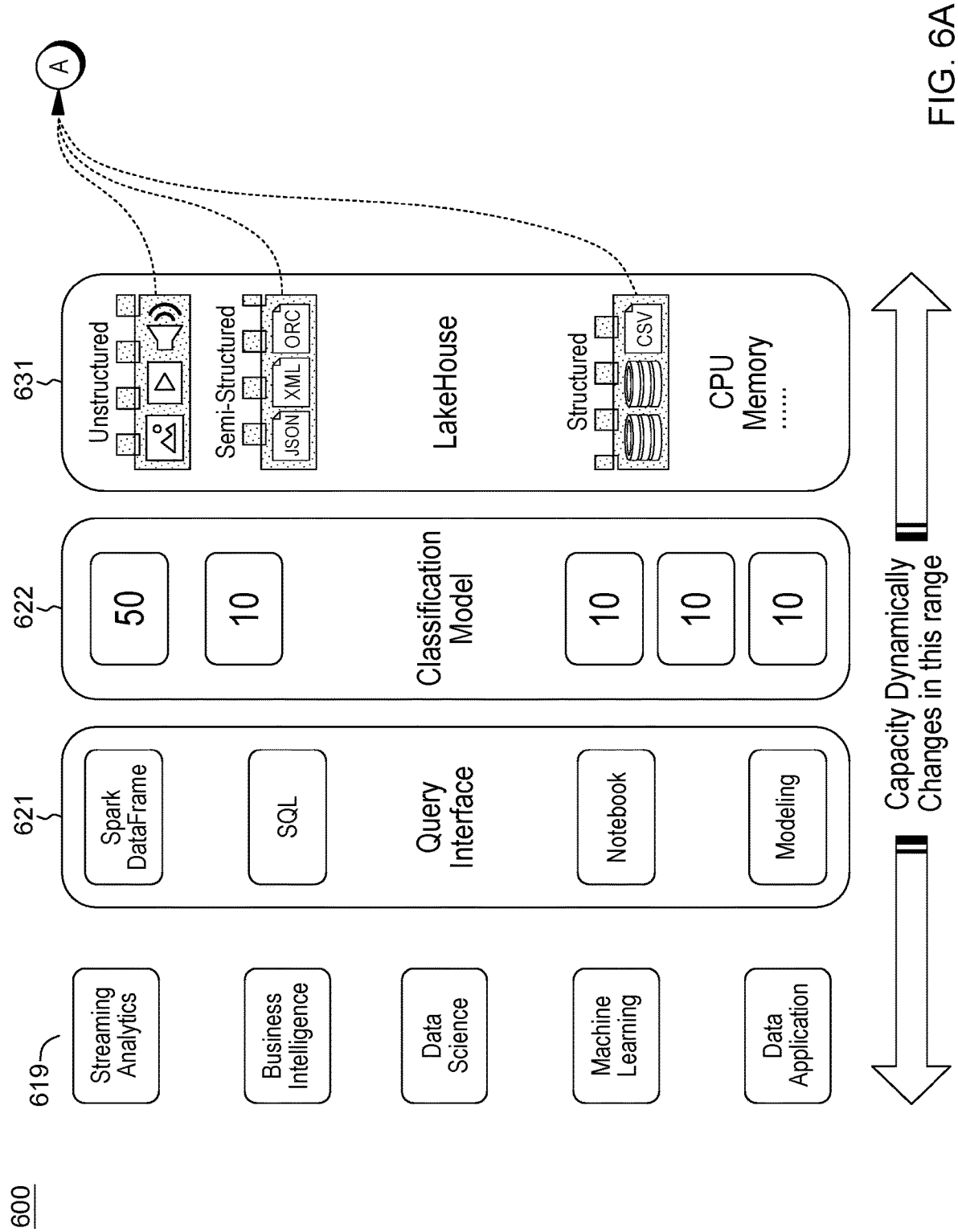
FIG. 6 (which includes FIGS. 6A and 6B) is an overview of the technical architecture of an environment into which various aspects of the examples herein have been implemented.
Figure 6B:
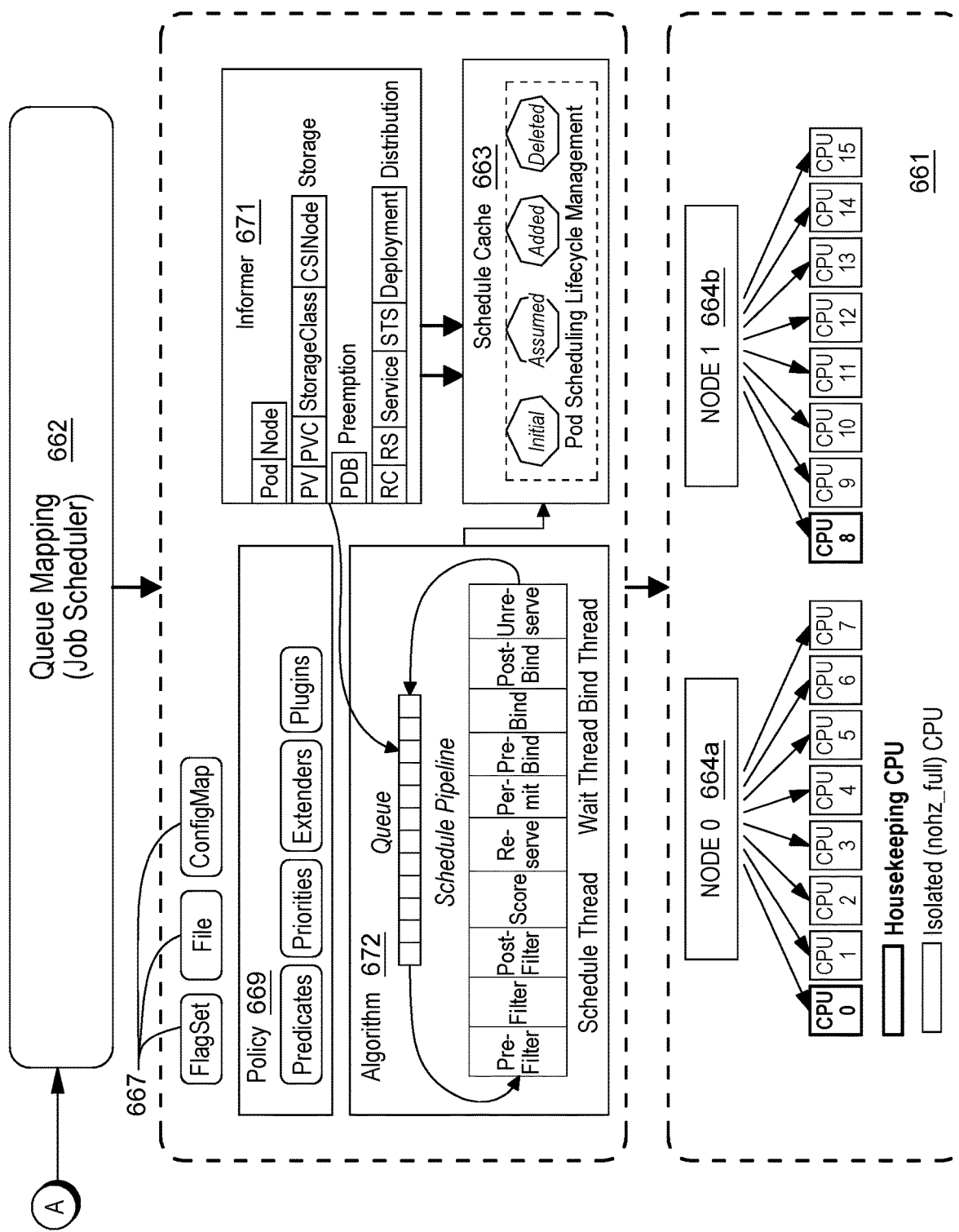

FIG. 6 (which includes FIG. 6A and FIG. 6B) provides aspects of a technical architecture 600 into which aspects of the examples herein have been integrated. In this technical architecture 600, program code of a query interface 621 (e.g., Spark DataFrame, SQL, Notebook, Modeling) obtains queries from various sources 619 (e.g., streaming analytics, BI, data science, ML, data application). The interface 621 extracts input (e.g., FIGS. 4-5 412, 512) from the queries and provides the input to a classification model 622, which can classify the queries based on predicted resource utilization (whether they will be intensive on certain resource types), and predicted duration for execution. The queries, to execute, access data from one or more database, and in this non-limiting example, a data lakehouse 631 (e.g., a single-repository model of data warehouses for unified storage). The data accessed by the queries during execution (and to return results) include unstructured data, semi-structured data, and structured data. The data lakehouse 631 comprises CPU, memory, and additional resources. Once the classification model 622 has classified the queries (e.g., FIGS. 4-5, P1, P2, P3) the program code of a job scheduler 662 (also referred to as queue mapping as it provides this service), schedules the queries for execution by various resources 661 of the technical architecture 600 (of the distributed system) based on workload characteristics predicted by the classification model 622. The technical architecture 600 comprises an asymmetrical distributed database service (e.g., resources 661) where multiple databases are distributed across different nodes or servers (e.g., nodes 664a-664b). The nodes 664a-664b in this example comprise CPU, which include housekeeping CPU and isolated CPU. To label the resources 661 so that the scheduler 652 can match the queries to the resources 661, the program code can obtain information about system resources from system files (FlagSet, File, ConfigMap) and policies 669 (e.g., predicates, properties, extenders, plugins). Program code can provide information to a scheduler cache 663 so that the scheduler cache 663 can manage pod scheduling and lifecycles. Program code of an informer 671 can provide the schedule cache 663 with information including data related to nodes and pods, storage (e.g., PV, PVC, StorageClass, CSNode), pre-emption (e.g., PDB), and distribution (RC, RS, service, deployment).

Program code comprising an algorithm 672 schedules execution of the queries, with the schedule cache 663. The program code of the algorithm 672 can manage the queue of queries, generating and managing and execution pipeline. Program code in the examples herein can change the capacity of the sources 619, the query interface 621, the classification model 622, and the lakehouse 631, dynamically.

Various benefits in performance of the examples herein can be experienced in various distributed and shared computing environments, including by not limited to, in cloud computing environments. For example, in a cloud environment (or other distributed environment), database servers can be containerized and deployed as services (e.g., FIG. 6, database resources 661). During periods of high workload demand, program code executing on one or more processors can automatically start services that match the query requirements and can automatically stop surplus services to conserve resources. In private-cloud environments like mainframes where on-demand deployment is not as straightforward, queries can dynamically seek out servers with hardware configurations that best suit their needs. Simultaneously, by analyzing and predicting the resource requirements of different modules in the database system, high-pressure modules can be scaled up through virtualization and resource allocation. This scaling allows for efficient utilization of resources based on workload demands. In these examples, the various DBMSs (RMS (relational database service), DM (data manager), IM (index manager), and/or BM (buffer manager)) can communicate between each other. Additionally, multiple components can be hosted by containers and started by the program code with different configurations. In an example where there are three kinds of components hosted by nine containers, the full-connect combinations could implement twenty-seven (3*3*3) different configurations. Rather than using only call procedures to communicate between components in the containers, the program code can communicate using PCP/IP, DRDA, and/or REST from database to database. The data can be serialized by a sender and then deserialized by a receiver.

The examples herein include computer-implemented methods, computer program products, and computer systems, where program code executing on one or more processor obtains one or more queries from one or more sources via a query interface. The program code analyzes the one or more queries to obtain attributes of the one or more queries. The program code applies a trained classifier to the attributes to classify the one or more queries into finite categories based on a predicted usage of a given resource type of a plurality of resource types exceeding a pre-determined threshold and an anticipated execution duration for each query of the one or more queries. The program code determines, based on the finite categories of the one or more queries and resource configurations of resources comprising the database service, which resource of the resources can efficiently execute each query of the one or more queries. The program code schedules each query of the one or more queries for execution by the determined resources.

In some examples, the program code determines which resources can executed the queries by matching a portion of the queries of the one or more queries with the predicted usage of the given resource type exceeding the pre-determined threshold to a given resource comprising the given resource type, where the given resource comprises a capacity to execute queries of the anticipated execution duration of the portion of the queries.

In some examples, the attributes of the one or more queries are selected from the group consisting of: statics from a catalog, explain information, parser trees, tokenized SQL text data, and sources selected from the one or more sources.

In some examples, the program code trains a classifier, to generate the trained classifier. To train the classifier, the program code obtains query attributes and corresponding labels for a dataset comprising training data queries, where the corresponding labels indicate an initial classification for each training data query, or the training data queries based on preprocessing the training data queries. The program code identifies relevant features in the query attributes of the training data queries indicating a usage of the given resource type exceeding the pre-determined threshold or an execution duration for each query of the training data queries. The program code trains the classifier to identify the relevant features in incoming queries, the one or more queries comprise the incoming queries.

In some examples, the query attributes of the training data queries are selected from the group consisting of table statistics, access paths, SQL text, and query sources from the one or more sources.

In some examples, the query attributes comprise statistics and the statistics are selected from the group consisting of: cardinality, number of pages, active blocks, and number of overflows.

In some examples, the query attributes comprise access paths and the access paths are selected from the group consisting of: parallelism, sorting, tablespace scan, JOINs, and aggregation.

In some examples, the query attributes comprise SQL text and the attributes are selected from the group consisting of: involvement of a function and whether SQL is read only.

In some examples, the query attributes comprise query sources and the query sources are selected from the group consisting of: business intelligence, online transaction processing, machine learning, streaming analytics, data science, and data applications.

In some examples, the program code applying the trained classifier comprises the program code outputting a query tag and a priority for each query of the one or more queries.

In some examples, the query tag indicates the predicted usage of the given resource type exceeding the pre-determined threshold and the anticipated execution duration for each query.

In some examples, the given resource type is selected from the group consisting of: central processing unit, memory, and input/output.

In some examples, the program code scheduling further comprises: the program code generating the database service as an asymmetrical database service, wherein the resources comprising the database service comprise configurations, and the program code tagging the resources based on the configurations. The tags can indicate a compatibility with query execution requirements indicated by the query tag of the one or more queries.

In some examples, the resources are distributed across at least two nodes.

In some examples, a portion of the resources comprise microservices.

In some examples, the program code scheduling comprises: the program code determining if the resources of the database service have a capacity to execute the one or more queries. Based on the determining that the resources of the database service have the capacity, the program code queues each query of the one or more queries for execution by the determined resources. Based on determining that the resources of the database service do not have the capacity, the program code increases capacity of the determined resources of the database service and queuing each query of the one or more queries for execution by the determined resources.

In some examples, the program code executes each query of the one or more queries based on the scheduling.

Although various embodiments are described above, these are only examples. For example, reference architectures of many disciplines may be considered, as well as other knowledge-based types of code repositories, etc., may be considered. Many variations are possible.

Various aspects and embodiments are described herein. Further, many variations are possible without departing from the spirit of aspects of the present disclosure. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of scheduling query execution by a database service based on predicted workload characteristics of one or more queries, the method comprising:
    obtaining, by one or more processors, the one or more queries from one or more sources via a query interface;
    analyzing, by the one or more processors, the one or more queries to obtain attributes of the one or more queries;
    training, by the one or more processors, a classifier, to generate a trained classifier, the training comprising:
    identifying, by the one or more processors, relevant features in query attributes of training data queries indicating a usage of the given resource type exceeding the pre-determined quantity threshold or an execution duration for each query of the training data queries;
    applying, by the one or more processors, a trained classifier to the attributes to classify the one or more queries into finite categories based on a predicted usage quantity of a given resource type of a plurality of resource types exceeding a pre-determined quantity threshold and an anticipated execution duration for each query of the one or more queries, wherein each resource type is utilized by the database service to execute queries;
    determining, by the one or more processors, based on the finite categories of the one or more queries and resource configurations of resources comprising the database service, which resource of the resources can efficiently execute each query of the one or more queries; and
    scheduling, by the one or more processors, each query of the one or more queries for execution by the determined resources.

2. The computer-implemented method of claim 1, wherein the determining comprises matching a portion of the queries of the one or more queries with the predicted usage of the given resource type exceeding the pre-determined threshold to a given resource comprising the given resource type, wherein the given resource comprises a capacity to execute queries of the anticipated execution duration of the portion of the queries.

3. The computer-implemented method of claim 1, wherein the attributes of the one or more queries are selected from the group consisting of: statics from a catalog, explain information, parser trees, tokenized SQL text data, and sources selected from the one or more sources.

4. The computer-implemented method of claim 1, wherein training the classifier to generate the trained classifier further comprises:
    obtaining, by the one or more processors, query attributes and corresponding labels for a dataset comprising training data queries, wherein the corresponding labels indicate an initial classification for each training data query, or the training data queries based on preprocessing the training data queries; and
    training, by the one or more processors, the classifier, to identify the relevant features in incoming queries, wherein the one or more queries comprise the incoming queries.

5. The computer-implemented method of claim 4, wherein the query attributes of the training data queries are selected from the group consisting of table statistics, access paths, SQL text, and query sources from the one or more sources.

6. The computer-implemented method of claim 5, wherein the query attributes comprise statistics and the statistics are selected from the group consisting of: cardinality, number of pages, active blocks, and number of overflows.

7. The computer-implemented method of claim 5, wherein the query attributes comprise access paths and the access paths are selected from the group consisting of: parallelism, sorting, tablespace scan, JOINs, and aggregation.

8. The computer-implemented method of claim 5, wherein the query attributes comprise SQL text and the attributes are selected from the group consisting of: involvement of a function and whether SQL is read only.

9. The computer-implemented method of claim 5, wherein the query attributes comprise query sources and the query sources are selected from the group consisting of: business intelligence, online transaction processing, machine learning, streaming analytics, data science, and data applications.

10. The computer-implemented method of claim 1, wherein applying the trained classifier comprises outputting a query tag and a priority for each query of the one or more queries.

11. The computer-implemented method of claim 10, wherein the query tag indicates the predicted usage of the given resource type exceeding the pre-determined threshold and the anticipated execution duration for each query.

12. The computer-implemented method of claim 11, where the given resource type is selected from the group consisting of: central processing unit, memory, and input/output.

13. The computer-implemented method of claim 11, wherein the scheduling further comprises:
generating, by the one or more processors, the database service as an asymmetrical database service, wherein the resources comprising the database service comprise configurations; and
tagging, by the one or more processors, the resources based on the configurations, wherein the tags indicate a compatibility with query execution requirements indicated by the query tag of the one or more queries.

14. The computer-implemented method of claim 13, wherein the resources are distributed across at least two nodes.

15. The computer-implemented method of claim 13, wherein a portion of the resources comprise microservices.

16. The computer-implemented method of claim 1, wherein the scheduling comprises:
determining, by the one or more processors, that the resources of the database service have a capacity to execute the one or more queries; and
based on determining that the resources of the database service have the capacity, queuing each query of the one or more queries for execution by the determined resources.

17. The computer-implemented method of claim 1, further comprising:
executing, by the one or more processors, each query of the one or more queries based on the scheduling.

18. The computer-implemented method of claim 1, wherein the scheduling comprises:
determining, by the one or more processors, that the resources of the database service do not have a capacity to execute the one or more queries; and
based on determining that the resources of the database service do not have the capacity, increasing capacity of the determined resources of the database service and queuing each query of the one or more queries for execution by the determined resources.

19. A computer system for scheduling query execution by a database service based on predicted workload characteristics of one or more queries, the computer system comprising:
a memory; and
one or more processors in communication with the memory, wherein the computer system is configured to perform a method, said method comprising:
obtaining, by the one or more processors, the one or more queries from one or more sources via a query interface;
analyzing, by the one or more processors, the one or more queries to obtain attributes of the one or more queries;
training, by the one or more processors, a classifier, to generate a trained classifier, the training comprising:
identifying, by the one or more processors, relevant features in query attributes of training data queries indicating a usage of the given resource type exceeding the pre-determined quantity threshold or an execution duration for each query of the training data queries;
applying, by the one or more processors, a trained classifier to the attributes to classify the one or more queries into finite categories based on a predicted usage quantity of a given resource type of a plurality of resource types exceeding a pre-determined quantity threshold and an anticipated execution duration for each query of the one or more queries, wherein each resource type is utilized by the database service to execute queries;
determining, by the one or more processors, based on the finite categories of the one or more queries and resource configurations of resources comprising the database service, which resource of the resources can efficiently execute each query of the one or more queries; and
scheduling, by the one or more processors, each query of the one or more queries for execution by the determined resources.

20. A computer program product for scheduling query execution by a database service based on predicted workload characteristics of one or more queries, the computer program product comprising:
one or more computer readable storage media and program instructions collectively stored on the one or more computer readable storage media readable by at least one processing circuit to:
obtain, by one or more processors, the one or more queries from one or more sources via a query interface;
analyze, by the one or more processors, the one or more queries to obtain attributes of the one or more queries;
train, by the one or more processors, a classifier, to generate a trained classifier, comprising:
identify, by the one or more processors, relevant features in query attributes of training data queries indicating a usage of the given resource type exceeding the pre-determined quantity threshold or an execution duration for each query of the training data queries;
apply, by the one or more processors, a trained classifier to the attributes to classify the one or more queries into finite categories based on a predicted usage quantity of a given resource type of a plurality of resource types exceeding a pre-determined quantity threshold and an anticipated execution duration for each query of the one or more queries, wherein each resource type is utilized by the database service to execute queries;
determine, by the one or more processors, based on the finite categories of the one or more queries and resource configurations of resources comprising the database service, which resource of the resources can efficiently execute each query of the one or more queries; and
schedule, by the one or more processors, each query of the one or more queries for execution by the determined resources.

* * * * *